(12) United States Patent
Mimura et al.

(10) Patent No.: US 6,685,323 B1
(45) Date of Patent: *Feb. 3, 2004

(54) TRIANGULAR-PYRAMIDAL CUBE-CORNER RETROREFLECTIVE SHEETING

(75) Inventors: Ikuo Mimura, Uozu (JP); Keiji Adachi, Uozu (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/914,358

(22) PCT Filed: Feb. 26, 1999

(86) PCT No.: PCT/JP99/00937

§ 371 (c)(1),
(2), (4) Date: Aug. 27, 2001

(87) PCT Pub. No.: WO00/52503

PCT Pub. Date: Sep. 8, 2000

(51) Int. Cl.⁷ .............................................. G02B 5/124
(52) U.S. Cl. .................................... 359/530; 359/529
(58) Field of Search ............................... 359/529, 530, 359/531, 532, 546, 547, 548; 362/297, 341, 529, 530; 428/156, 167, 141

(56) References Cited

U.S. PATENT DOCUMENTS

| | | | |
|---|---|---|---|
| 2,310,790 A | 2/1943 | Jungersen | 88/105 |
| 2,380,447 A | 7/1945 | Jungersen | 88/78 |
| 2,481,757 A | 9/1949 | Jungersen | |
| 3,190,178 A | 6/1965 | McKenzie | |
| 3,712,706 A | 1/1973 | Stamm | 350/103 |
| 3,830,682 A | 8/1974 | Rowland | 161/2 |
| 4,025,159 A | 5/1977 | McGrath | 350/105 |
| RE29,396 E | 9/1977 | Heenan | 204/281 |
| 4,349,598 A | 9/1982 | White | 428/161 |
| 4,498,733 A | 2/1985 | Flanagan | 350/102 |
| 4,588,258 A | 5/1986 | Hoopman | 350/103 |
| 4,775,219 A | 10/1988 | Appeldorn et al. | 350/103 |
| 4,801,193 A | 1/1989 | Martin | 350/103 |
| 4,897,136 A | 1/1990 | Bailey et al. | 156/145 |
| 5,064,272 A | 11/1991 | Bailey et al. | 359/541 |
| 5,122,902 A * | 6/1992 | Benson | 359/529 |

(List continued on next page.)

FOREIGN PATENT DOCUMENTS

| | | |
|---|---|---|
| EP | 0 137 736 | 4/1985 |
| EP | 0 175 031 | 3/1986 |
| EP | 0 548 280 | 6/1993 |
| EP | 96/10197 | 4/1996 |
| EP | 0 830 621 | 11/2001 |
| EP | 1 164 390 | 12/2001 |
| GB | 441319 | 12/1933 |
| JP | 63-143502 | 6/1988 |
| JP | 11-305017 | 11/1999 |
| WO | 92/04647 | 3/1992 |
| WO | WO 94/14091 | 6/1994 |
| WO | WO 95/11463 | 4/1995 |
| WO | WO 95/11465 | 4/1995 |
| WO | WO 95/11470 | 4/1995 |

*Primary Examiner*—Thong Nguyen
*Assistant Examiner*—Joshua L Pritchett
(74) *Attorney, Agent, or Firm*—Fitzpatrick, Cella, Harper & Scinto

(57) ABSTRACT

To provide a triangular-pyramidal cube-corner retroreflective sheeting having a novel structure characterized in that a lateral face (face c) using a base edge (x) of triangular-pyramidal reflective elements faced each other and arranged in the closest-packed state by sharing the base edge (x) on a first bottom plane (virtual plane X-X') forms a triangle, two other faces (faces a and b) sharing one ridge line started from an apex (H) of the triangular-pyramidal reflective elements form a quadrangle, and the height (h') from the apex (H) up to the first bottom plane (virtual plane X-X') is substantially smaller than the height (h) from the apex (H) up to the substantially horizontal second bottom plane (Z-Z') including base edges (z and w) of the other lateral faces (faces a and b).

10 Claims, 5 Drawing Sheets

U.S. PATENT DOCUMENTS

| | | | |
|---|---|---|---|
| 5,138,488 A | 8/1992 | Szczech | 359/529 |
| 5,264,063 A | 11/1993 | Martin | 156/247 |
| 5,376,431 A | 12/1994 | Rowland | 428/164 |
| 5,557,836 A | 9/1996 | Smith et al. | 29/527.4 |
| 5,564,870 A | 10/1996 | Benson et al. | 409/131 |
| 5,600,484 A | 2/1997 | Benson et al. | 359/529 |
| 5,696,627 A | 12/1997 | Benson et al. | 359/529 |
| 5,706,132 A | 1/1998 | Nestegard et al. | 359/529 |
| 5,721,640 A | 2/1998 | Smith et al. | 359/530 |
| 5,764,413 A | 6/1998 | Smith et al. | 359/530 |
| 5,831,767 A | 11/1998 | Benson et al. | 359/529 |
| 5,840,405 A | 11/1998 | Shusta et al. | 428/156 |
| 5,840,406 A | 11/1998 | Nilsen | 428/156 |
| 5,844,712 A | 12/1998 | Caroli | 359/529 |
| 5,854,709 A | 12/1998 | Couzin | 359/529 |
| 5,889,615 A | 3/1999 | Dreyer | 359/529 |
| 5,898,523 A | 4/1999 | Smith et al. | 359/530 |
| 5,914,812 A | 6/1999 | Benson et al. | 359/529 |
| 5,981,032 A | 11/1999 | Smith et al. | 428/167 |
| 5,988,820 A | 11/1999 | Huang et al. | 359/530 |
| 6,036,322 A | 3/2000 | Nilsen et al. | 359/529 |
| 6,083,607 A * | 7/2000 | Mimura et al. | 362/297 |
| 6,155,689 A | 12/2000 | Smith | 359/530 |
| 6,206,525 B1 | 3/2001 | Rowland et al. | 359/530 |
| 6,390,629 B1 * | 5/2002 | Mimura et al. | 359/530 |

* cited by examiner

TRIANGULAR-PYRAMIDAL CUBE-CORNER RETROREFLECTIVE SHEETING

TECHNICAL FIELD

The present invention relates to a triangular-pyramidal cube-corner retroreflective sheeting having a novel structure. More minutely, the present invention relates to a triangular-pyramidal cube-corner retroreflective sheeting characterized in that triangular-pyramidal reflective elements respectively having a novel structure are arranged in the closest-packed state.

Still more minutely, the present invention relates to a triangular-pyramidal cube-corner retroreflective sheeting constituted of triangular cube-corner retroreflective elements (hereafter also referred to as triangular-pyramidal reflective elements or merely referred to as elements) useful for signs including license plates of automobiles and motorcycles, safety materials of clothing and life jackets, markings of signboards, and reflectors of visible light, laser beams, and infrared-ray reflective sensors.

Still more minutely, the present invention relates to a triangular-pyramidal cube-corner retroreflective sheeting characterized in that triangular-pyramidal cube-corner retroreflective elements protruded beyond a first common bottom plane (virtual plane X-X') are arranged so as to be faced each other in the closest-packed state on the first bottom plane (virtual plane X-X') by sharing each base edge on the first bottom plane (virtual plane X-X'), the first bottom plane (virtual plane X-X') is a common plane including the base edges (x, x, . . . ) shared by the triangular-pyramidal reflective elements, two opposite triangular-pyramidal reflective elements form a substantially-same-shape element pair faced each other so as to be substantially symmetric to planes (Y-Y', Y-Y', . . . ) vertical to the first bottom plane including the shared base edges (x, x, . . . ) on the first bottom plane (virtual plane X-X'), the triangular-pyramidal reflective elements are formed by substantially same triangular lateral faces (faces $c_1$ and $c_2$) using each of the shared base edges (x, x, . . . ) as one side and two substantially same quadrangular lateral faces (faces $a_1$ and $b_1$ or faces $a_2$ or $b_2$) substantially perpendicularly crossing the lateral faces (faces $c_1$ and $c_2$), which (the above lateral faces $a_1$ and $b_1$ or lateral faces $a_2$ or $b_2$) use each of two upper sides of the triangular lateral faces (faces $c_1$ and $c_2$) started from apexes ($H_1$ and $H_2$) of the triangular-pyramidal reflective elements as one side and share one ridge line of the triangular-pyramidal reflective elements as one side, and the height (h') from the apexes ($H_1$ and $H_2$) of the triangular-pyramidal reflective elements up to the first bottom plane (virtual plane X-X') including the base edges (x, x, . . . ) of the triangular lateral faces (faces $c_1$ and $c_2$) of the triangular-pyramidal reflective elements is substantially smaller than the height (h) from the apexes ($H_1$ and $H_2$) of the triangular-pyramidal reflective elements up to a substantilly-horizontal second bottom plane (Z-Z') including base edges (z and w) of other lateral faces (faces $a_1$ and $b_1$ or faces $a_2$ or $b_2$) of the triangular-pyramidal reflective elements.

BACKGROUND ART

A retroreflective sheeting is well known which reflects incoming light toward a light source and the sheeting using its retroreflective performance is widely used for the above application fields. Particularly, a retroreflective sheeting using the retroreflection principle of a cube-corner retroreflective element such as a triangular-pyramidal reflective element is exceptionally superior to a conventional retroreflective sheeting using micro-glass-beads in retroreflective efficiency of light and its purpose has expanded year by year because of its superior retroreflective performance.

However, though a conventionally publicly-known triangular-pyramidal retroreflective element shows a preferable retroreflective efficiency in a range of a small angle formed between the optical axis of the element (axis passing through the apex of a triangular pyramid which is present at the equal distance from three faces crossing each other at 90° and which constitutes a triangular-pyramidal cube-corner retroreflective element) and an entrance ray (this small angle is hereafter referred to as entrance angle), the retroreflective efficiency is suddenly deteriorated as the entrance angle increases (that is, entrance angularity is deteriorated).

Moreover, the reflection principle of a triangular-pyramidal retroreflective element conforms to the internal total reflection caused at the interface between air and a transparent medium constituting the triangular-pyramidal reflective element when light is transmitted into the air from the transparent medium at a specified angle {critical angle $(\alpha_c)$} or more. The critical angle $(\alpha_c)$ is shown by the following expression in accordance with the refractive index (n) of the transparent medium and the refractive index (n') of the air.

$$\sin\alpha_c = \frac{n'}{n}$$

In the above expression, because it is assumed that the refractive index (n') of the air is almost equal to 1 and constant, the critical angle $(\alpha_c)$ decreases as the value of the refractive index (n) of the transparent medium increases and thereby, light more easily reflects at the interface between the transparent medium and the air. In general, because most synthetic resins have a refractive index of approx. 1.5, the critical angle $(\alpha_c)$ becomes a comparatively large value of approx. 42°.

Light incoming to the surface of a retroreflective sheeting using the above triangular-pyramidal reflective element at a large entrance angle passes through the triangular-pyramidal reflective element and reaches the interface between the element and air at a comparatively small angle. When the angle is less than the critical angle $(\alpha_c)$, the light is transmitted to the back of the element without totally reflecting from the interface. Therefore, a retroreflective sheeting using a triangular-pyramidal reflective element generally has a disadvantage that the entrance angularity is inferior.

However, because a triangular-pyramidal retroreflective element can reflect light in the direction from which the light enters almost over the entire surface of the element, reflected light does not diverge in a wide angle due to spherical aberration like the case of a micro-glass-bead reflective element.

However, the narrow divergent angle of the retroreflected light easily practically causes a trouble that when the light emitted from the head lamp of an automobile retroreflects from a traffic sign, the retroreflected light doe not easily reach eyes of a driver present at a position separate from the optical axis of the light. The trouble of this type more frequently occurs (that is, an observation angle is deteriorated) because the angle (observation angle) formed between the entrance axis of rays and the axis (observation axis) connecting a driver with a reflection point increases particularly when an automobile approaches a traffic sign.

For the above cube-corner reflective sheeting, particularly a triangular-pyramnidal cube-corner retroreflective sheeting, many proposals have been known and various improvements and studies have been made.

For example, Jungersen's U.S. Pat. No. 2,481,757 discloses a retroreflective sheeting constituted by arranging retroreflective elements of various shapes on a thin sheet and a method for manufacturing the sheeting. The above U.S. patent discloses a triangular-pyramidal reflective element whose apex is located at the center of a bottom-plane triangle and a tilted triangular-pyramidal reflective element whose apex is not located at the center of a bottom-plane triangle and that light is efficiently reflected toward an automobile coming nearer. Moreover, it is disclosed that a triangular-pyramidal reflective element has a depth of 1/10 in (2,540 μm) or less. Moreover, FIG. 15 of the above U.S. patent illustrates a triangular-pyramidal reflective element pair whose optical axis is tilted in the positive (+) direction which is opposite to the case of a preferred embodiment of the present invention whose optical axis is tilted in the negative (−) direction. The tilt angle (θ) of the optical axis is estimated as approx. 6.5° when calculating the angle in accordance with the ratio between the major and minor sides of the bottom-plane triangle of the illustrated triangular-pyramidal reflective element.

However, the above Jungersen's U.S. patent does not specifically discloses a very-small triangular-pyramidal reflective element disclosed by the present invention or does not disclose or suggest a size and an optical-axis tilt of a triangular-pyramidal reflective element required to obtain superior observation angularity and entrance angularity.

In this specification, as described later in detail, the expression "tilted in a direction in which optical axis becomes negative (−)" denotes that when triangular-pyramidal reflective elements protruded beyond a common plane (X-X') share each of base edges (x, x, . . . ) and bottom planes of the reflective elements are arranged in the closest-packed state on the common plane (X-X') including the base edges (x, x, . . . ) shared by the retroreflective elements as element pairs faced so as to be substantially symmetric to a plane (Y-Y') vertical to the common plane (X-X'), the optical axis tilts in a direction in which the difference (q−p) between the distance (q) from the intersection (Q) between the optical axis of the triangular-pyramidal reflective elements and the common plane (X-X') up to the plane (Y-Y') vertical to the plane (X-X') and the distance (p) from the intersection (P) between a vertical line extended from the apexes ($H_1$ and $H_2$) of the elements to the bottom plane of the elements and the plane (X-X') up to the vertical plane (Y-Y') becomes negative (−). Moreover, the state in which the optical axis tilts in a direction in which (q−p) becomes positive (+) is hereafter shown as "tilted in a direction in which optical axis becomes positive (+)".

Furthermore, Stamm's U.S. Pat. No. 3,712,706 discloses a retroreflective sheeting in which so-called equilateral-triangular-pyramidal cube-corner retroreflective elements whose bottom-plane shapes are equilateral triangles are arranged on a thin sheeting so that bottom planes of the elements are brought into the closest-packed state. The above Stamm's U.S. patent improves the problem of deterioration of a retroreflective efficiency due to increase of an entrance angle and the above trouble that light incoming at an angle less than the internal total reflection condition passes through the interface between elements and thereby, it does not retroreflect by applying vacuum evaporation to the reflection face of a reflective element to cause mirror reflection.

However, because the above Stamm's proposal uses the mirror-reflection principle as means for improving wide angularity, a trouble easily occurs that the appearance of an obtained retroreflective sheeting becomes dark or reflectivity easily deteriorates because a metal such as aluminum or silver used for a mirror-face layer is oxidized by water or air in service. Moreover, means for improving wide angularity in accordance with a tilt of an optical axis is not described at all.

Moreover, Hoopman's European Pat. No. 137,736(B1) discloses a retroreflective sheeting in which tilted triangular-pyramidal cube-corner retroreflective elements with isosceles bottom-plane triangles are arranged on a thin sheeting so that bottom planes of the elements are brought into the closest-packed state on the common plane. The optical axis of the triangular-pyramidal cube-corner retroreflective element disclosed in the above patent tilts in a negative (−) direction similarly to the tilt direction of the optical axis of a preferred triangular-pyramidal reflective element of the present invention and its tilt angle ranges between 7° and 13°.

However, according to the relation between reflectivity and optical-angle tilt by the light tracking method attempted by the present inventor et al., it is found that reflectivity deteriorates as the tilt angle of the optical axis increases exceeding 4° in the negative direction, particularly the reflectivity of a triangular-pyramidal reflective element whose optical-axis tilt exceeds 6° in the negative direction is extremely deteriorated. This may be because though areas of three prism faces a, b, and c forming a triangular-pyramidal reflective element whose optical axis is not tilted are equal to each other, areas of faces a and b of an element whose optical axis is tilted gradually decrease compared to the area of the face c of the element as the tilt angle of the optical axis increases.

Moreover, Szczech's U.S. Pat. No. 5,138,488 discloses a retroreflective sheeting in which tilted triangular-pyramidal cube-corner retroreflective elements with isosceles bottom-plane triangles are arranged on a thin sheeting so that bottom planes of the elements are brought into the closest-packed state on the common plane. In the case of this U.S. patent, optical axes of the triangular-pyramidal reflective elements tilt in the direction of a side shared by two triangular-pyramidal reflective elements which are faced each other and paired and it is specified that the tilt angle ranges between about 2°–5° and each element has a size of 25 to 100 μm.

Moreover, in the case of European Patent No. 548,280 (B1) corresponding to the above U.S. patent, it is disclosed that the distance between a plane including the common side of two paired elements and vertical to a common plane and the apex of the element is not equal to the distance between the intersection between the optical axis of the element and the common plane and the vertical plane, that is, the direction of the tilt of the optical axis is positive (+) or negative (−), and the tilt angle ranges between about 2°–5°, and the element has a size of 25 to 100 μm.

As described above, in the case of Szczech's European Pat. No. 548,280(B13), the tilt of an optical axis ranges between ±2° and ±5°. However, it is impossible to obtain completely improvement of wide angularity, particularly improvement of entrance angularity from the tilt of the optical axis in the range of Szczech's invention.

The triangular-pyramidal cube-corner retroreflective elements of the above-described already-publicly-known Jungersen's U.S. Pat. No. 2,481,757, Stamm's U.S. Pat. No. 3,712,706, Hoopman's European Pat. No. 137,736(B1), Szczech's U.S. Pat. No. 5,138,488, and European Pat. No.

548,280(B1) are common in that bottom planes of many triangular-pyramidal reflective elements serving as cores of entrance and reflection of light are present on the same plane and each of retroreflective sheetings constituted of the triangular-pyramidal reflective elements whose bottom planes are present on the same plane has a disadvantage that the sheeting is inferior in entrance angularity, that is, when the entrance angle of rays to each triangular-pyramidal reflective element increases, the retroreflectivity is suddenly deteriorated.

As basic optical characteristics requested for a triangular-pyramidal cube-corner retroreflective sheeting, high reflectivity, that is, not only intensity (magnitude) of reflectivity represented by the reflectivity of light incoming from the front of the sheeting but also wide angularity are requested. Moreover, observation angularity, entrance angularity, and rotation angularity are requested for the wide angularity.

As described above, retroreflective sheetings constituted of the already-publicly-known triangular-pyramidal cube-corner retroreflective elements are all inferior in entrance angularity and moreover, they are not satisfactory in observation angularity in general. However, the present inventor et al. find through light tracking simulations that it is possible to improve the entrance angularity of a retroreflective sheeting constituted of the triangular-pyramidal reflective element by making the height (h') from apexes ($H_1$ and $H_2$) of the triangular-pyramidal reflective elements up to a first bottom plane (virtual plane X-X') including base edges (x, x, . . . ) of triangular lateral faces (faces $c_1$ and $c_2$) of the triangular-pyramidal ,reflective element smaller than the height (h) from the apexes ($H_1$ and $H_2$) of the triangular-pyramidal reflective element up to a substantially-horizontal second bottom plane (Z-Z') including base edges (z and w) of other lateral faces (faces $a_1$ and $b_1$ or faces $a_2$ or $b_2$) of the triangular-pyramidal reflective element.

DISCLOSURE OF THE INVENTION

More minutely, the present invention relates to a triangular-pyramidal cube-corner retroreflective sheeting in which triangular-pyramidal cube-corner retroreflective elements protruded beyond a first common bottom plane (virtual plane X-X') are arranged so as to be faced each other in the closest-packed state on the first bottom plane (virtual plane X-X') by sharing each base edge on the first bottom plane (virtual plane X-X'), the first bottom plane (virtual plane X-X') is a common plane including the base edges (x, x, . . . ) shared by the triangular-pyramidal reflective elements, two opposite triangular-pyramidal reflective elements form a substantially-same-shape element pair faced each other so as to be substantially symmetric to planes (Y-Y', Y-Y', . . . ) vertical to the first bottom plane including the shared base edges (x, x, . . . ) on the first bottom plane (virtual plane X-X'), the triangular-pyramidal reflective elements are formed by substantially same triangular lateral faces (faces $c_1$ and $c_2$) using each of the shared base edges (x, x, . . . ) as one side and two substantially same quadrangular lateral faces (faces $a_1$ and $b_1$ or faces $a_2$ or $b_2$) substantially perpendicularly crossing the lateral faces (faces $c_1$ and $c_2$), which (the above lateral faces $a_1$ and $b_1$ or lateral faces $a_2$ or $b_2$) use each of two upper sides of the triangular lateral faces (faces $c_1$ and $c_2$) started from apexes ($H_1$ and $H_2$) of the triangular-pyramidal reflective elements as one side, and share one ridge line of the triangular-pyramidal reflective elements as one side, and the height (h') from the apexes ($H_1$ and $H_2$) of the triangular-pyramidal reflective elements up to the first bottom plane (virtual plane X-X') including the base edges (x, x, . . . ) of the triangular lateral faces (faces $c_1$ and $c_2$) of the triangular-pyramidal reflective elements is substantially smaller than the height (h) from the apexes ($H_1$ and $H_2$) of the triangular-pyramidal reflective elements up to a substantially-horizontal second bottom plane (Z-Z') including base edges (z and w) of other lateral faces (faces $a_1$ and $b_1$ or faces $a_2$ or $b_2$) of the triangular-pyramidal reflective elements.

A more-preferable triangular-pyramidal cube-corner retroreflective sheeting of the present invention is characterized in that triangular-pyramidal cube-corner retroreflective elements protruded beyond a first common bottom plane (virtual plane X-X') are faced each other and arranged on the first bottom plane in the closest-packed state by sharing each base edge on the first bottom plane (virtual plane X-X'), the first bottom plane (virtual plane X-X') is a common plane including the base edges (x, x, . . . ) shared by the triangular-pyramidal reflective elements, two opposite triangular-pyramidal reflective elements form a substantially-same-shape element pair faced so as to be symmetric to planes (Y-Y', Y-Y', . . . ) vertical to the first bottom plane including shared base edges (x, x, . . . ) on the first bottom plane (virtual plane X-X'), lateral faces (faces $c_1$ and $c_2$) using each of the shared base edges (x, x, . . . ) of the triangular-pyramidal reflective elements as one side form substantially same triangles and are arranged along the shared base edges (x, x, . . . ), two other lateral faces (faces $a_1$ and $b_1$ or faces $a_2$ or $b_2$) form substantially same quadrangular lateral faces by using each of two upper sides of the triangular lateral faces (faces $c_1$ and $c_2$) started from apexes ($H_1$ and $H_2$) of the triangular-pyramidal reflective elements as one side and sharing one ridge line of the triangular-pyramidal reflective elements as one side, a second bottom plane (Z-Z') including base edges (z and w) of the lateral faces (faces $a_1$ and $b_1$) formed because the quadrangular lateral faces (faces $c_1$ and $c_2$) cross the corresponding quadrangular lateral faces (face $a_2$ or face $b_2$) of other adjacent triangular-pyramidal reflective elements is substantially parallel with the first bottom plane (virtual plane X-X'), located substantially below the first bottom plane (virtual plane X-X') including base edges (x, x, . . . ) of the triangular-pyramidal reflective elements, and tilted in a direction in which the difference (q–p) between the distance (q) from the intersection (Q) between the optical axis via apexes of the triangular-pyramidal reflective elements and the second bottom plane (Z-Z') up to a plane (Y-Y') including base edges (x, x, . . . ) shared by the element pair and vertical to the first bottom plane (X-X') and the distance (p) from the intersection (P) between a vertical line extended from the apexes ($H_1$ and $H_2$) of the elements up to the second bottom plane (Z-Z') up to the vertical plane (Y-Y') including the base edges (x, x, . . . ) shared by the element pair becomes negative (–) so that the optical axis tilts by at least 3° from the vertical line ($H_1$-P) extended from apexes of the triangular-pyramidal reflective elements to the second bottom plane.

The present invention is more-minutely described below by properly referring to the accompanying drawings.

DETAILED DESCRIPTION OF THE INVENTION

A conventionally-publicly-known art is described below before describing the present invention.

Figure 1:
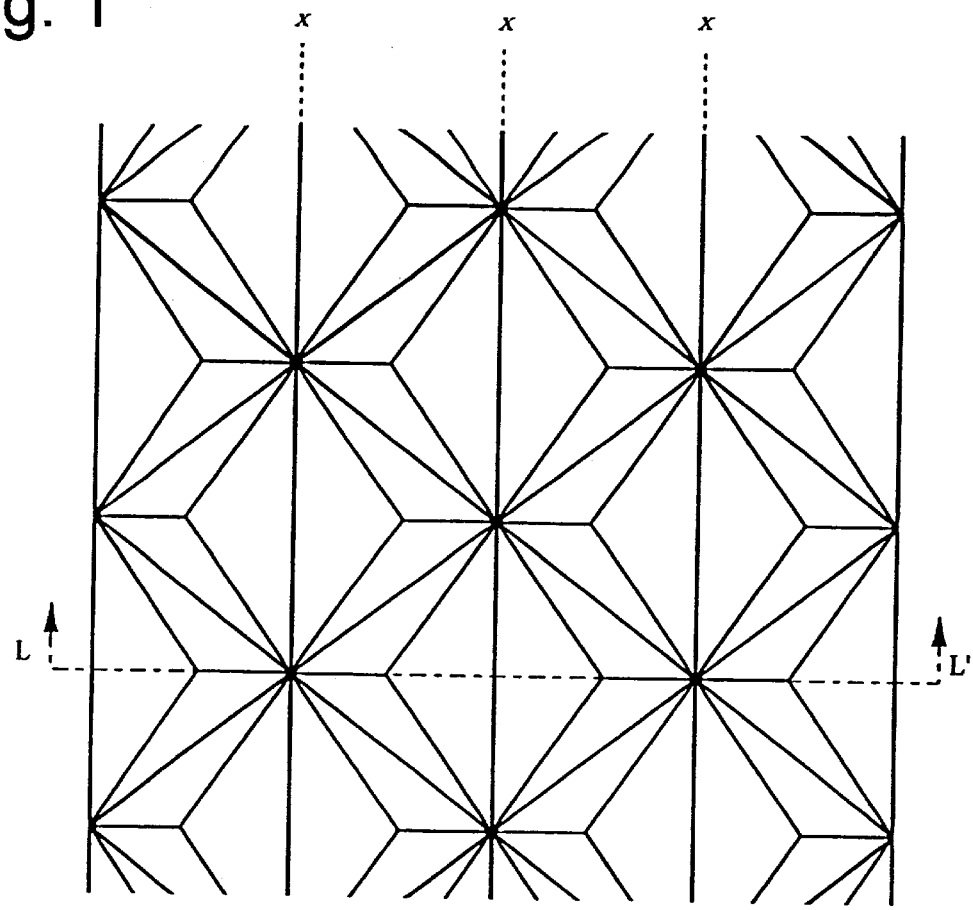
FIG. 1 is a top view of triangular-pyramidal cube-corner retroreflective elements according to the prior art.
Figure 2:
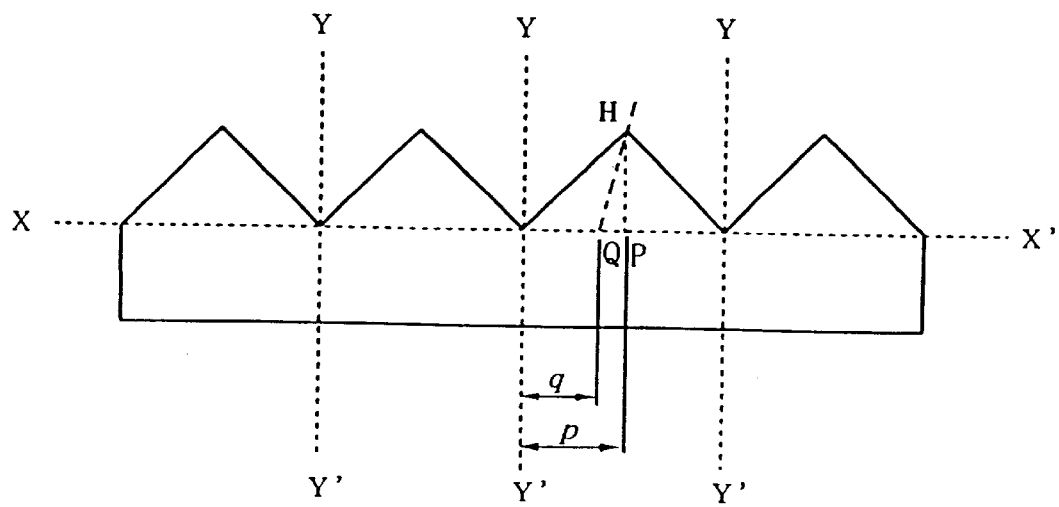
FIG. 2 is a sectional view of triangular-pyramidal cube-corner retroreflective elements according to the prior art.

FIGS. 1 and 2 show a top view and a sectional view for explaining triangular-pyramidal cube-corner retroreflective elements according to the prior art for comparison with triangular-pyramidal cube-corner retroreflective elements of the present invention. In FIG. 1, triangular-pyramidal cube-corner retroreflective elements protruded beyond a common plane share each of base edges (x, x, . . . ) and bottom planes of the elements are arranged on a common plane (X-X') sharing each of base edges (x, x, . . . ) and including the base edges (x, x, . . . ) shared by the retroreflective elements in the closest-packed state as a triangular-pyramidal reflective-element pair faced each other so as to be substantially symmetric to a plane (Y-Y') vertical to the common plane (X-X').

Moreover, FIG. 2 shows a sectional view of the triangular-pyramidal reflective elements cut at the sectional line (L-L') of the element group shown in FIG. 1. The optical axis of the element pair is present on a tilted triangular-pyramidal cube-corner retroreflective sheeting and tilts from a vertical plane (Y-Y') in a direction in which the difference (q−p) between the distance (p) from the intersection (P) between a vertical line extended from the apex (H) of the elements to a bottom plane (X-X') up to a base edge shared by the element pair the distance (q) from the intersection (Q) between the optical axis and the bottom plane up to the base edge shared by the element pair become negative (−).

Figure 3:
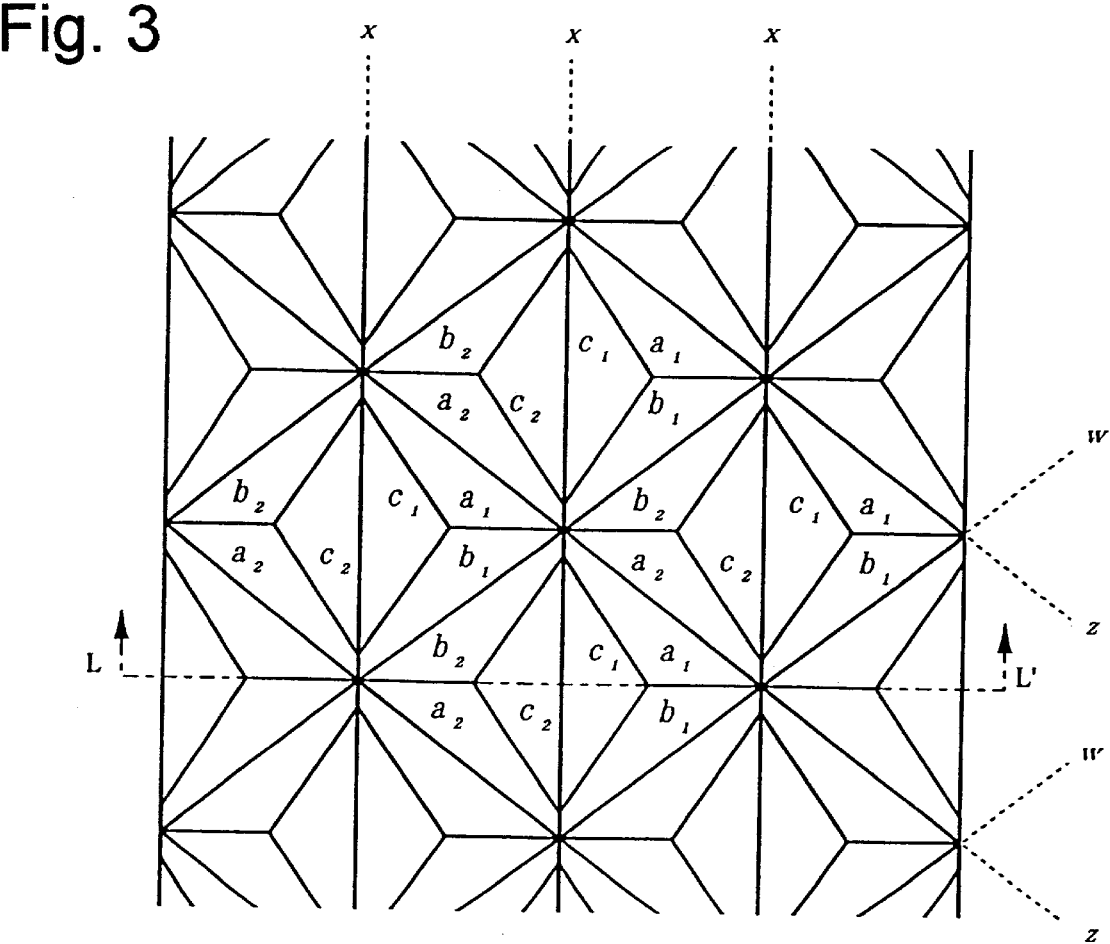
FIG. 3 is a top view of triangular-pyramidal cube-corner retroreflective elements for explaining the present invention.
Figure 4:
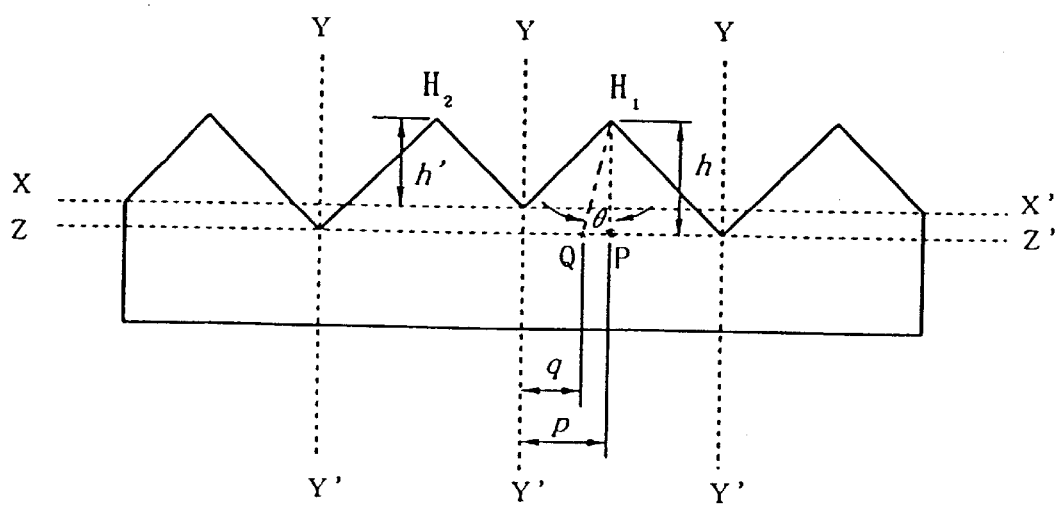
FIG. 4 is a sectional view of triangular-pyramidal cube-corner retroreflective elements for explaining the present invention.

FIGS. 3 and 4 show a top view and a sectional view for explaining triangular-pyramidal cube-corner retroreflective elements of the present invention. FIG. 3 shows that triangular-pyramidal cube-corner retroreflective elements protruded beyond a first common bottom plane (virtual plane X-X') share one base edge on the first bottom plane (virtual plane X-X') and are faced each other and arranged on the bottom plane in the closest-packed state. FIG. 4 shows a sectional view of triangular-pyramidal reflective elements of the present invention cut at the sectional line (L-L') of the element group shown in FIG. 3. As shown in FIG. 3, triangular-pyramidal reflective elements of the present invention are formed by substantially same triangular lateral faces (faces $c_1$ and $c_2$) using each of base edges (x, x, . . . ) of the elements as one side and two substantially same quadrangular lateral faces (faces $a_1$ and $b_1$ or faces $a_2$ or $b_2$) substantially perpendicularly crossing lateral faces (faces $c_1$ and $c_2$), which (the above lateral faces $a_1$ and $b_1$ and lateral faces $a_2$ or $b_2$) use each of two upper sides of the triangular lateral faces (faces $c_1$ and $c_2$) started from the apexes ($H_1$ and $H_2$) of the triangular-pyramidal reflective elements as one side, and share one ridge line of the triangular-pyramidal reflective elements as one side.

As shown in FIG. 3, triangular-pyramidal reflective elements of the present invention share each of base edges (x, x, . . . ) on a first bottom plane (virtual plane X-X') are arranged in the closest-packed state at a repetitive pattern to form a substantially-same-shape element pair faced so as to be substantially symmetric. However, because the first bottom plane (virtual plane X-X') is located substantially above a second plane (Z-Z') serving as a common plane, the base edges (x, x. . . . ) are formed like an intermittent broken line at certain intervals without forming a continuous straight line though they are present on a straight line. Moreover, base edges (x, x, . . . ) shared by a group of adjacent other triangular-pyramidal reflective element pairs are parallel with the broken straight line constituting the former base edges (x, x. . . . ) to form a parallel straight-line group like a broken line having an equal repetitive pitch.

Therefore, the lateral faces (faces $c_1$ and $c_2$) of triangular-pyramidal reflective elements of the present invention share base edges (x, x, . . . ) and are faced each other. However, the base edges (x, x, . . . ) do not form a continuous straight line as described above but they are formed like a broken line kept at certain intervals. Moreover, the face cl does not form a continuous plane through it is present on a virtual plane but it forms independent substantially-isosceles-triangular strings arranged in the same pattern by keeping certain intervals. The same is true for the face $c_2$. A virtual plane including the string of the face $c_1$ and a virtual plane including the string of the face $c_2$ cross each other to form a groove whose cross section is V-shaped and moreover they are faced each other by forming a broken line including base edges (x, x, . . . ) common to the faces $c_1$ and $c_2$.

The term "substantial" in this specification is an expression including even a very small difference. For example, "substantially symmetric" and "substantially same shape" are expressions including cases in which corresponding sides and/or anges are completely the same and magnitudes of the sides or angles are very-slightly different from each other by, for example, 1% or less of values of the sides or angles.

Figure 5:
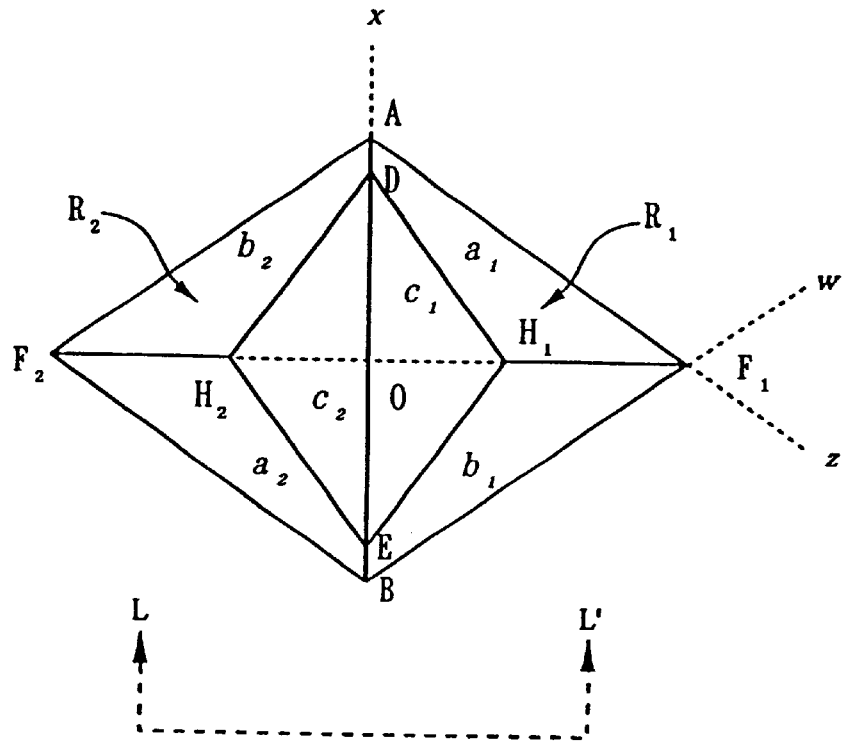
FIG. 5 is an enlarged top view of a pair of triangular-pyramidal reflective elements for explaining the present invention.
Figure 6:
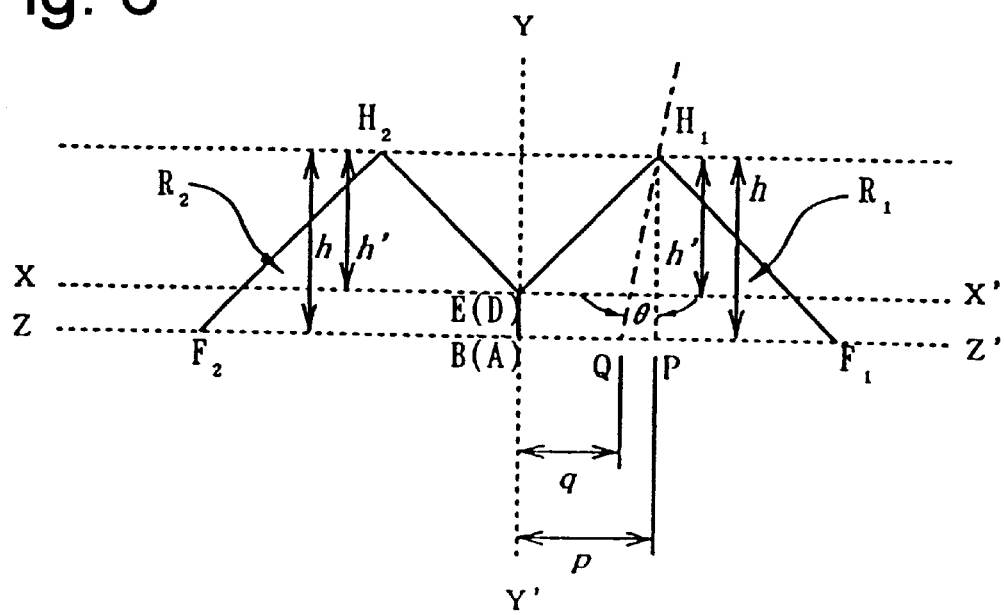
FIG. 6 is an enlarged sectional view of a pair of triangular-pyramidal reflective elements for explaining the present invention.

To easily understand the present invention, an enlarged top view of a pair of triangular-pyramidal reflective elements shown by the following symbols in FIG. 3 is shown in FIG. 5 and a side view of the elements taken along the line L-L' in FIG. 3 is shown in FIG. 6.

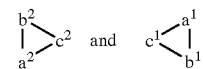

In FIG. 6, the face $c_1$ of the right one $R_1$ (that is, the element shown by the following symbol in FIG. 3) of a pair of triangular-pyramidal reflective elements of the present invention is a triangular face enclosed by points $H_1$-D-E, the face $a_1$ is a quadrangular face enclosed by points $H_1$-$F_1$-A-D, the face $b_1$ is a quadrangular face enclosed by points $H_1$-$F_1$-B-E, the faces $a_1$ and $b_1$ are the substantially same shape, and the faces $c_1$, $a_1$, and $b_1$ are substantially perpendicularly crossed each other. Moreover, the bottom plane of the right triangular-pyramidal reflective element $R_1$ forms a part of a second bottom plane (Z-Z') serving as a common plane.

In FIG. 6, the left triangular-pyramidal reflective element shown as $R_2$ corresponds to left one (shown by the following symbol in FIG. 3) of the above pair of triangular-pyramidal reflective elements shown in FIG. 3 and its bottom plane is shown by A-B-$F_2$.

The left triangular-pyramidal reflective element $R_2$ whose bottom plane is shown by A-B-$F_2$ substantially has the same shape as the right reflective element $R_1$ whose bottom plane is shown by A-B-$F_1$ and located at right and left of a base edge (D-E) (the base edge is present on the shared base edge x in FIG. 3) shared by the faces $c_1$ and $c_2$ of the both elements and the left element $R_2$ has a shape obtained by rotating the right element $R_1$ about the center point (O) of the base edge (D-E) shared by the right and left elements $R_1$ and $R_2$ by 180° counterclockwise on the base plane X-X'.

Therefore, the face $c_2$ shown by points $H_2$-D-E, the face $b_2$ shown by points $H_2$-$F_2$-A-D, and the face $a_2$ shown by points $H_2$-$F_2$-B-E of the left element $R_2$ in FIG. 5 respectively substantially have the same shapes as the faces $c_1$, $a_1$, and $b_1$ of the right element $R_1$ and the faces $c_2$, $a_2$, and $b_2$ are also substantially perpendicularly crossed each other.

Therefore, in FIG. 6 showing a side view taken along the line L-L' in FIG. 5, a side view of the right element $R_1$ shown by points B-E-$H_1$-$F_1$ and the side view of the left element $R_2$ shown by points B-E-$H_2$-$F_2$ are substantially symmetric to right and left and have the same shape.

As shown in FIG. 6, apexes of the triangular-pyramidal reflective elements ($R_1$ and $R_2$) of the present invention are shown as $H_1$ and $H_2$ and the height from the first bottom plane (virtual plane X-X') of the apexes ($H_1$ and $H_2$) is shown as h'.

Moreover, as clearly understood from FIGS. 5 and 6, quadrangular lateral faces $a_1$ and $b_1$ and lateral faces $a_2$ or $b_2$ of the triangular-pyramidal reflective elements $R_1$ and $R_2$ of the present invention substantially have the same shape and the base edges $F_2$-B and $F_2$-A of the lateral faces $a_1$ and $b_1$ of the element $R_1$ and the base edges $F_2$-B and $F_2$-A of the lateral faces $a_2$ or $b_2$ of the element $R_2$ are present on the second bottom plane (Z-Z') serving as a common plane.

Therefore, depths of valleys formed between the lateral faces $a_1$, $b_1$, $a_2$, and $b_2$ of the triangular-pyramidal reflective elements $R_1$ and $R_2$ of the present invention and corresponding lateral faces of other adjacent elements from a plane including apexes $H_1$ and $H_2$ (bottom portions of the valleys serve as base edges of the lateral faces $a_1$, $b_1$, $a_2$ or $b_2$) are shown as h.

Moreover, the base edge (D-E) shared by the opposite faces $c_1$ and $c_2$ of the triangular-pyramidal reflective elements $R_1$ and $R_2$ of the present invention is present on the first common plane (virtual plane X-X') as shown in FIGS. 5 and 6 and the height from the first bottom plane (virtual plane X-X') up to the apexes $H_1$ and $H_2$ of the elements $R_1$ and $R_2$ is shown as h' in FIG. 6. Furthermore, the height h' corresponds to the depth of the V-shaped valley formed by the faces $c_1$ and $c_2$ from a plane (virtual plane) including the apexes $H_1$ and $H_2$ of the elements.

Triangular-pyramidal reflective elements ($R_1$, $R_2$, . . . ) of the present invention are characterized in that the depth (h') of the valley formed by faces $c_1$ and $c_2$ is smaller than the depth (h) of the valley formed by faces $a_1$, $b_1$, $a_2$, and $b_2$ (and faces corresponding to the faces $a_1$, $b_1$, $a_2$, and $b_2$).

Moreover, as shown in FIGS. 3 and 5, in the case of triangular-pyramidal reflective elements of the present invention, base edges of the faces $a_1$ and $a_2$ of the elements $R_1$ and $R_2$ are present on a common line z, base edges of the faces $b_1$ and $b_2$ of the elements $R_1$ and $R_2$ are present on a common line w, and base edges of the faces $c_1$ and $c_2$ of the elements $R_1$ and $R_2$ are present on a common line x.

When assuming the height from the first bottom plane (virtual plane X-X') of the apexes ($H_1$ and $H_2$) of triangular-pyramidal reflective elements of the present invention as h' and the height from the second bottom plane (Z-Z') of the apexes ($H_1$ and $H_2$) as h, it is preferable to use a triangular-pyramidal cube-corner retroreflective sheeting in which the value of h'/h ranges between 0.67 and 0.95, particularly preferable to use a triangular-pyramidal cube-corner retroreflective sheeting in which the value of h'/h ranges between 0.71 and 0.93.

As shown in FIGS. 3 to 6, two corresponding faces c of triangular-pyramidal reflective elements of the present invention share base edges (x, x . . . ), which are faced each other and arranged on a first bottom plane (virtual plane X-X') including the shared base edges (x, x, . . . ) in the closest-packed state as already described.

In the case of the present invention, when referring to FIGS. 3 to 6, it is preferable to use a triangular-pyramidal cube-corner retroreflective sheeting characterized in that trial-pyramidal cube-corner retroreflective elements protruded beyond a first common bottom plane (virtual plane X-X') are faced each other and arranged on the first bottom plane in the closest-packed state by sharing a base edge on the first bottom plane (virtual plane X-X'), the first bottom plane (virtual plane X-X') is a common plane including the base edges (x, x, . . . ) shared by the triangular-pyramidal reflective elements, the two faced triangular-pyramidal reflective elements form a substantially-same-shape element pair faced so as to be substantially symmetric to planes (Y-Y', Y-Y', . . . ) vertical to the first bottom plane including the base edges (x, x, . . . ) on the first bottom plane (virtual plane X-X'), lateral faces (faces $c_1$ and $c_2$) using each of the base edges (x, x, . . . ) shared by the triangular-pyramidal reflective elements as one side substantially form the same triangles and are arranged along the shared base edges (x, x, . . . ), two other lateral faces (faces $a_1$ and $b_1$ or faces $a_2$ or $b_2$) forming the triangular-pyramidal reflective elements form the substantially same quadrangular lateral faces using each of two upper sides of the triangular lateral faces (faces $c_1$ and $c_2$) started from apexes ($H_1$ and $H_2$) of the triangular-pyramidal reflective elements as one side and sharing a ridge line of the triangular-pyramidal reflective elements as one side, a second bottom plane (Z-Z') including base edges (z and w) of the lateral faces (faces $a_1$ and $b_1$) formed because the quadrangular lateral faces (face $a_1$ and $b_1$) cross the corresponding quadrangular lateral face (face $a_2$ or $b_2$) of other triangular-pyramidal reflective elements adjacent to the quadrangular lateral faces is substantially parallel with the first bottom plane (virtual plane X-X') and located substantially below the first bottom plane (virtual plane X-X') including the base edges (x, x, . . . ) of the triangular-pyramidal reflective elements, and the optical axis via apexes of the triangular-pyramidal reflective elements tilts by at least 3° from a vertical line ($H_1$-P) extended from the apexes of the triangular-pyramidal reflective elements to the second bottom plane in a direction in which the difference (q−p) between the distance (q) from the intersection (Q) between the optical axis and the second bottom plane (Z-Z') up to the plane (Y-Y') vertical to the first bottom plane (X-X') and the distance (p) from the intersection (P) between a vertical line extended from the apexes ($H_1$ and $H_2$) of the elements to the second bottom plane (Z-Z') and the second bottom plane (Z-Z') up to the vertical plane (Y-Y') including the base edges (x, x, . . . ) shared by the elements become negative (−).

In the case of the present invention, when referring to FIG. 6, it is preferable to set an optical-axis tilt angle (θ) which is an angle (θ) of the optical axis passing through the apex $H_1$ of the triangular-pyramidal reflective element $R_1$ from a vertical line ($H_1$-P) extended from the apex $H_1$ to the second bottom plane (Z-Z') {this can be also assumed as the plane (Y-Y') vertical to the first bottom plane (X-X')} to at least 3°.

In the case of the present invention, it is preferable to use a triangular-pyramidal cube-corner retroreflective sheeting characterized in that the optical axis of triangular-pyramidal reflective elements tilts by 4° to 12° from a vertical line ($H_1$-P) extended from apexes ($H_1$ and $H_2$) of triangular-pyramidal reflective elements to a second bottom plane (Z-Z') in a direction in which the difference (q−p) between the distance (p) from the intersection (P) between the vertical line and the second bottom plane (Z-Z') up to the vertical plane (Y-Y') and the distance (q) from the intersection (Q) between the optical axis and the second bottom plane (Z-Z') up to the vertical plane (Y-Y') becomes negative (−), particularly preferable to use a triangular-pyramidal cube-corner retroreflective sheeting characterized in that the optical axis tilts by 5° to 10° from the vertical line ($H_1$-P) in a direction in which the above (q−p) becomes negative (−).

Moreover, in the case of the present invention, it is preferable to use a triangular-pyramidal cube-corner retroreflective sheeting having triangular-pyramidal reflective elements in which the distance (h) from a second bottom plane (Z-Z') including base edges (z and w) of substantially same quadrangular lateral faces (faces $a_1$ and $b_1$ or faces $a_2$ and $b_2$) formed because the lateral faces (faces $a_1$ and $b_1$) protruded beyond a first bottom plane (virtual plane X-X') and sharing a ridge line using each of apexes ($H_1$ and $H_2$) of triangular-pyramidal cube-corner retroreflective elements as one side and using the ridge line as one side cross corresponding quadrangular lateral faces (faces $a_2$ or $b_2$) of other adjacent triangular-pyramidal reflective elements up to the apexes ($H_1$ and $H_2$) of the triangular-pyramidal reflective elements ranges between 50 and 400 μm, particularly ranges between 60 and 200 μm, further particularly ranges between 70 and 100 μm.

As described above, because the height (h') from the apexes ($H_1$ and $H_2$) of triangular-pyramidal reflective elements u to the first bottom plane (virtual plane X-X') is substantially smaller than the height (h) from the apexes ($H_1$ and $H_2$) of the triangular-pyramidal reflective elements up to the second bottom plane (Z-Z'), various improved optical characteristics are obtained.

These improved optical characteristics can be achieved because it is possible to decrease the area of the face $c_1$ compared to the face $c_1$ of a lateral face of the prior art in which h' is equal to h, in other words, it is possible to relatively increase areas of faces $a_1$ and $b_1$. Particularly, in the case of the light entering faces $a_1$ and $b_1$ at an angle almost vertical to faces $a_1$ and $b_1$ in other words, a large entrance angle, entrance angularity is remarkably improved because areas of the faces $a_1$ and $b_1$ are increased.

Moreover, improvement of optical characteristics according to increase of the areas of the faces $a_1$ and $b_1$ is especially remarkable for triangular-pyramidal reflective elements in which an optical axis is tilted, particularly when the optical axis tilts in a direction in which the difference (q−p) between the distances (p) and (q) of the triangular-pyramidal reflective elements becomes negative (−).

In the case of the present invention, when an optical axis tilts so that the (q−p) becomes negative (−) as described above, entrance angularity is particularly improved.

In the case of normal triangular-pyramidal reflective elements in which an optical axis is not tilted according to the prior art, three lateral faces (faces $a_1$, $b_1$, and $c_1$ or faces $a_2$, $b_2$, and $c_2$) constituting the elements are right-angled isosceles triangles and areas of them are also equal to each other. However, as described above, when tilting the optical axis of the elements so that (q−p) becomes negative (−), disadvantages occur that areas of two lateral faces (faces $a_1$ and $b_1$ or faces $a_2$ or $b_2$) become smaller than areas before the optical axis is tilted and the probability of causing three-face reflection and retroreflection is lowered.

For entrance rays to reflect from three lateral faces and efficiently retroreflect, it is preferable that areas of three lateral faces are equal to each other. In the case of tilted triangular-pyramidal reflective elements according to the prior art, however, the probability of causing three-face reflection and retroreflection described above is lowered because areas of the two lateral faces (faces $a_1$ and $b_1$ or faces $a_2$ or $b_2$) become smaller than lateral faces (faces $c_1$ and $c_2$) sharing base edges (x, x, . . . ). Therefore, the retroreflective performance (front reflectivity) of the light incoming from the front is deteriorated and the retroreflective performance (entrance angularity) when the entrance angle increases is also deteriorated.

When an optical axis tilts so that (q−p) becomes negative (−), areas of lateral faces (faces $a_1$ and $b_1$ or faces $a_2$ or $b_2$) of triangular-pyramidal reflective elements decrease to approx. 90% when the optical-axis tilt angle (θ) is equal to −3°, approx. 87% when the angle (θ) is equal to −4°, and approx. 65% when the angle (θ) is equal to −12° and front reflectivity and entrance angularity are deteriorated due to the above decrease of areas.

Figure 7:
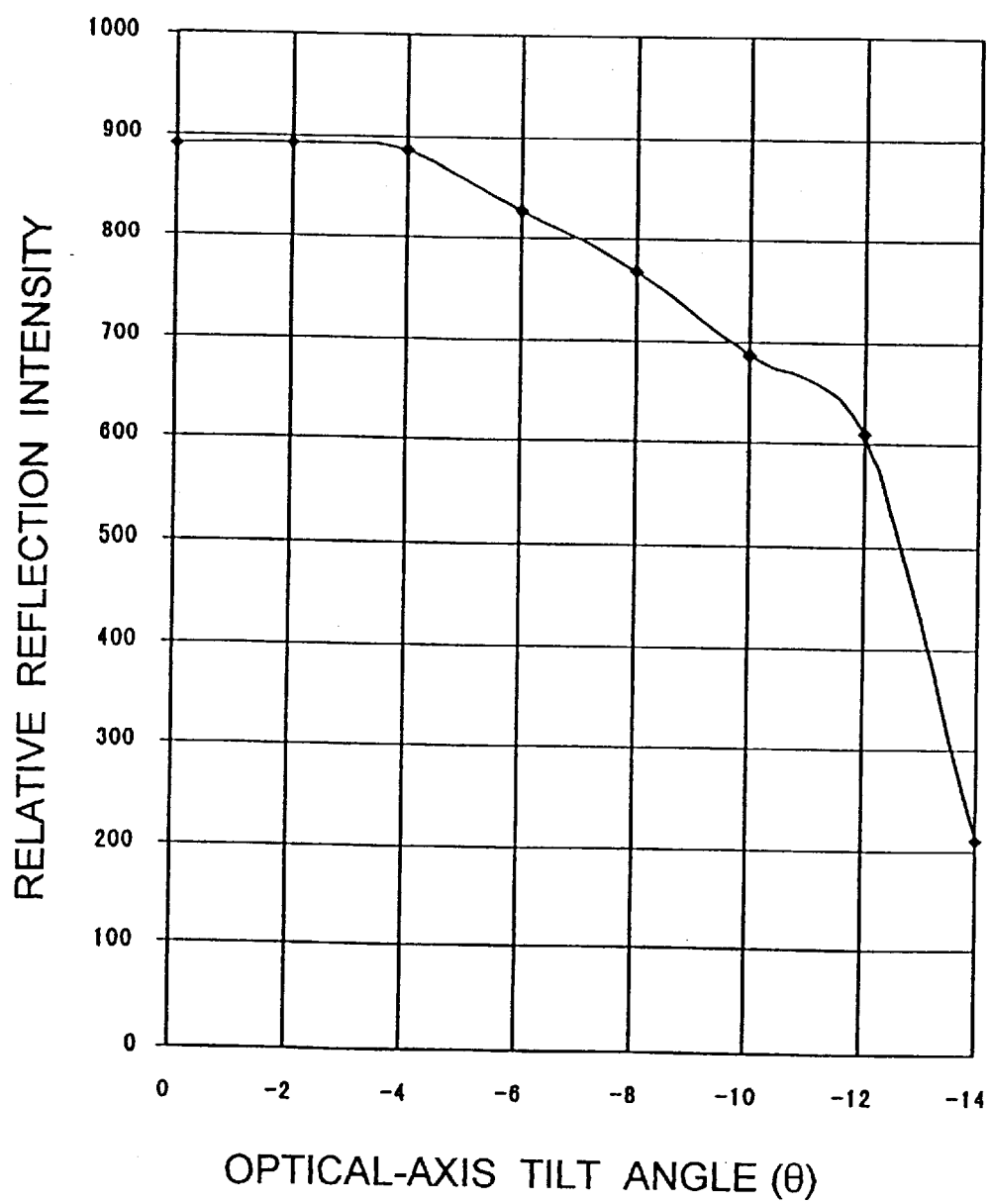
FIG. 7 is a graph showing the relation between optical-axis tilt angle (θ) and calculated front brightness obtained from light tracking simulation.

It is possible to confirm the deterioration of the front reflectivity due to decrease of the area ratio through geometrical-optical light-tracking computer simulation. FIG. 7 shows the front reflectivity calculated by fixing the height (h) of triangular-pyramidal reflective elements according to the prior art to 80 μm and assuming the entrance angle and operation angle as 0° when changing optical-axis tilt angles (θ) from 0° to −14°. From FIG. 7, it is found that the calculated front reflectivity is further deteriorated as the tilt angle (θ) increases.

However, because triangular-pyramidal reflective elements of the present invention are designed so that the height (h) from apexes ($H_1$ and $H_2$) up to a second bottom plane (virtual plane Z-Z') is substantially larger than the height (h') up to a first bottom plane (X-X'), it is possible to make areas of two lateral faces (faces $a_1$ and $b_1$ or faces $a_2$ or $b_2$) larger than those of lateral faces of triangular-pyramidal reflective elements formed in accordance with the prior art.

Therefore, triangular-pyramidal reflective elements of the present invention make it possible to eliminate the disadvantage of reflectivity deterioration due to area reduction of faces a and b of triangular-pyramidal reflective elements caused by increasing the optical-axis tilt angle (θ) to 3° or more in a direction in which (q−p) becomes negative (−). Because of the above reason, it is preferable that an optical axis tilts so that the optical-axis tilt angle (θ) ranges between −4° and −12°, particularly ranges between −5 and −10° in the case of the present invention. In the case of a triangular-pyramidal reflective element tilting up to more than 12° in a direction in which the optical-axis tilt angle (θ) becomes negative (−), rotation angularity tends to deteriorate because the element is excessively deformed and reflectivity greatly depends on the direction of light entering the element (rotational angle).

In the case of a triangular-pyramidal reflective element of the present invention, the optimum optical characteristic is obtained when the value of h′/h preferably ranges between 0.67 and 0.95, more preferably ranges between 0.71 and 0.93. Because two lateral faces (faces $a_1$ and $b_1$ or faces $a_2$ or $b_2$) of a triangular-pyramidal reflective element pair meeting the value of h/h′ can have areas almost equal to those of lateral faces (faces $c_1$ and $c_2$) sharing base edges (x, x, . . . ), it is possible to increase rays which are three-face-reflected and retroreflected.

In the case of three lateral faces (faces $a_1$, $b_1$, and $c_1$) of triangular-pyramidal reflective elements of the present invention, the area ratio viewed from the front or the area ratio viewed from the entrance-axis direction is not greatly changed. Therefore, triangular-pyramidal reflective elements of the present invention are improved in both front reflectivity and entrance angularity.

Moreover, when the value of h′/h exceeds 0.95, the increase rate of areas of two lateral faces (faces $a_1$ and $b_1$ or faces $a_2$ or $b_2$) is not very remarkable. However, when h′/h is less than 0.67, the ratio between areas of these two lateral faces (faces $a_1$ and $b_1$ or faces $a_2$ or $b_2$) becomes excessively large compared to areas of lateral faces (faces $c_1$ and $c_2$) sharing a base edge. Therefore, it is difficult to improve optical characteristics because of the reason same as the above mentioned.

It is preferable that the height (h) from apexes ($H_1$ and $H_2$) of triangular-pyramidal reflective elements of the present invention up to a second bottom plane (Z-Z′) ranges between 50 and 400 μm and it is more preferable that the height (h) ranges between 60 and 200 μm. When the height (h) is less than 50 μm, the size of an element is excessively decreased. Therefore, divergence of retroreflected light becomes excessive in accordance with the diffraction effect decided by the bottom-plane opening area of the element and front reflectivity tends to deteriorate. Moreover, when the height (h) exceeds 400 μm, the thickness of a sheeting becomes excessively large and a soft sheeting cannot be easily obtained.

It is possible to manufacture a triangular-pyramidal cube-corner retroreflective sheeting of the present invention by generally using a cube-corner molding die in which shapes of the above-described triangular-pyramidal reflective elements are arranged on a metallic belt in the closest-packed state as inverted concave shapes, thermally pressing a proper soft resin sheeting superior in transparency and uniformity to be described later against the molding die, and inverting the shape of the die and transferring the inverted shape of the die to the resin sheeting.

A typical method for manufacturing the above cube-corner molding die is disclosed in the above Stamm's U.S. Pat. No. 3,712,706 in detail and the present invention can also use a method conforming to the above method.

Specifically, a microprism mother die in which convex very-small triangular pyramids are arranged in the closest-packed state is manufactured by using a carbide cutting tool (such as a diamond cutting tool or tungsten-carbide cutting tool) having a tip angle 66.4 to 53.7°, deciding each-directional repetitive pitch and groove depth (h) and a mutual crossing angle in accordance with the shape of a purposed triangular-pyramidal reflective element in two directions (z and w directions in FIG. 3), and thereby cutting V-shaped parallel grooves having the same groove depth (h) and a V-shaped cross section on a base material with a flatly-ground surface and moreover, using a similar carbide cutting tool having a tip angle of 78.5° to 100.5° and thereby cutting V-shaped parallel grooves in the third direction (x direction) at a repetitive pitch (repetitive pitch of line x in FIG. 3) which passes through the intersection between the formed z-directional and w-directional grooves and divides the supplementary angle of the crossing angle of these two directions (in this case, the acute angle is referred to as "crossing angle"). In this case, the depth (h′) of the x-directional groove is set so that it becomes smaller than the depth (h) of the z- and w-directional grooves.

In the case of a preferable mode of the present invention, the repetitive pitch in z and w directions ranges between 104 and 992 μm, the dept (h) of a groove ranges between 50 and 400 μm, the mutual crossing angle ranges between 64.7 and 75.1°, and the dept (h′) of an x-directional groove ranges between 33 and 380 μm.

These x-, w-, and z-directional grooves are generally cut so that cross sections of the grooves respectively form an isosceles triangle. However, it is also possible to cut the grooves so that the cross section of at least one of these three-directional grooves is slightly deviated from an isosceles triangle. As a specific cutting method, it is possible to cut a groove by a cutting tool whose tip shape is asymmetric to right and left or by slightly tilting the cutting tool. Thus, by slightly deviating the cross section of a groove from an isosceles triangle, it is possible to provide a slight angular deviation from the right angle (90°) for at least one of prism face angles of three lateral faces (faces $a_1$, $b_1$, and $c_1$ or faces $a_2$, $b_2$, and $c_2$) of triangular-pyramidal reflective elements obtained by slightly deviating the cross section of a groove from an isosceles triangle. Thereby, it is possible to properly diverge the light reflected from a triangular-pyramidal reflective element from a complete retroreflective direction.

It is preferable to use a metal-based material having a Vickers hardness (JIS Z 2244) of 350 or more, particularly 380 or more as a base material to be preferably used for the microprism mother die. Specifically, it is possible to use amorphous copper, electrodeposition nickel or aluminum. Moreover, as an alloy-based material it is possible to use copper-zinc alloy (brass), copper-tin-zinc alloy, nickel-cobalt alloy, nickel-zinc alloy, or aluminum alloy.

Furthermore, it is possible to use a synthetic-resin-based material as the above base material. It is preferable to use a material made of a synthetic resin having a glass transition point of 150° C. or higher or particularly 200° C or higher and a Rockwell hardness (JIS Z 2245) of 70 or more, particularly 75 or more because the material does not easily cause a trouble that the material is softened under cutting and therefor, it is difficult to accurately cut the material. Specifically, it is possible to use any one of polyethylene-terephthalate-based resin, polybutylene-terephthalate-based resin, polycarbonate-based resin, polymethyl-methacrylate-based resin, polyimide-based resin, polyacrylate-based resin, polyarylate-based resin, poly-ether-sulfon-based resin, polyetherimide-based resin, and cellulose-triacetate-based resin.

A flat plate can be formed by any one of the above synthetic resins in accordance with the normal resin molding method such as the extrusion molding method, calendar molding method, or solution casting method and moreover, heating and drawing can be performed according to necessity. Preparatory conducting treatment can be applied to a plane of the flat plate thus formed in order to simplify the conducting treatment and/or electroforming performed to form an electroforming die by a prism mother die manufactured by the above method. As the preparatory conducting treatment, it is possible to use the vacuum deposition method for depositing one of metals such as gold, silver, copper, aluminum, zinc, chromium, nickel, and selenium, cathode sputtering method using one of the above metals, or electroless plating method using copper or nickel. Moreover, it is permitted to mix conductive powder such as carbon black or organic metallic salt with a synthetic resin to provide conductivity for the flat plate.

Then, the surface of the obtained microprism mother die is electroformed and a metallic film is formed on the surface. By removing the metallic film from the surface of the mother die, it is possible to form a metallic die for molding a triangular-pyramidal cube-corner retroreflective sheeting of the present invention.

In the case of a metallic microprism mother die, the surface of the die is cleaned and then, the surface can be immediately electroformed. In the case of a synthetic-resin microprism mother die, however, it is necessary to apply conducting treatment to the surface of the prism of the mother die in order to provide conductivity for the surface before electroforming the surface. As the conducting treatment, it is possible to use sliver-mirror treatment, electroless plating, vacuum deposition, or cathode sputtering.

As the above sliver-mirror treatment, it is specifically possible to use a method of cleaning the surface of a mother die formed by the above method with an alkaline detergent to remove dirt such as oil component from the surface and then, activate the surface by using a surfactant such as tannic acid and then immediately forming the surface like a silver mirror by a silver-nitrate solution. For the silver-mirror formation, it is possible to use the spraying method using a two-cylinder nozzle gun for a silver-nitrate aqueous solution and a reducing-agent (glucose or glyoxal) aqueous solution, or an immersing method for immersing the surface of the mother die in a mixed solution of a silver-nitrate aqueous solution and a reducing-agent aqueous solution. Moreover, it is preferable to minimize the thickness of the silver-mirror film in the range of meeting the conductivity under electroforming such as 0.1 μm or less.

Electroless plating uses copper or nickel. For an electroless nickel-plating solution, it is possible to use nickel sulfate or nickel chloride as a water-soluble metallic salt of nickel and a solution obtained by adding a solution mainly containing citrate or malate to the electroless nickel-plating solution as a complexation agent or adding sodium hypophosphite, sodium borohydride, or amine Volan to the electroless nickel-plating solution as a reducing agent is used as a plating solution.

Vacuum deposition can be performed by cleaning the surface of a mother die similarly to the case of silver-mirror treatment, putting the mother die in a vacuum device, heating and vaporizing a metal such as gold, silver, copper, aluminum, zinc, nickel, chromium, or selenium, precipitating the metal on the surface of the cooled mother die, and forming a conductive film on the surface of the die. Moreover, cathode sputtering can be performed by putting a mother die treated similarly to the case of vacuum deposition in a vacuum device in which an anode table made of a metal such as aluminum or iron, setting a metallic foil similarly to that used for vacuum deposition to a cathode and charging the foil to cause glow discharge, thereby making a cation flow generated by the glow discharge collide with the metallic foil of the cathode to evaporate metal atoms or particles, precipitating the metal atoms or particles on the surface of the mother die, and forming a conductive film. Conductive films formed by these methods respectively have a thickness of 30 nm.

To form a smoother and uniform electroformed layer on a synthetic-resin prism mother die under electroforming, it is necessary to uniformly apply the above conducting treatment over the entire surface of the mother die. When the conducting treatment is ununiformly performed, a trouble may occur that the smoothness of the surface of an electroformed layer at a portion with a low conductivity is deteriorated or an electroformed layer is not formed but a defective portion is formed.

To avoid the above trouble, it is possible to use a method of improving wetness by a sliver-mirror solution by treating a treatment face with a solvent such as alcohol immediately before starting silver-mirror treatment. However, because a concave portion of a synthetic-resin mother die formed for the present invention is very deep and sharp, improvement of wetness tends to be insufficient. A trouble of a conductive film due to the concave shape easily occurs in evaporation.

To uniform the surface of an electroformed layer obtained through electroforming, activation is frequency performed. For the activation, it is possible to use a method of immersing the electro-formed layer in a 10 wt % sulfonic-acid aqueous solution.

When electroforming a synthetic-resin mother die to which silver-mirror treatment is applied, a silver layer is integrated with an electroformed layer and easily removed from the synthetic-resin mother die. However, when forming a conductive film made of nickel through electroless plating or cathode sputtering, it may be difficult to remove an electroformed layer from a synthetic-resin layer because the surface of a synthetic resin very closely contacts with the conductive film. In this case, it is preferable to apply the so-called removal treatment such as chromate treatment onto the conductive-film layer before starting electroforming. In this case, the conductive-film layer remains on the synthetic-resin layer after removed.

The synthetic-resin prism mother die with the conductive-film layer formed on its surface undergoes the above various treatments and then, an electroformed layer is formed on the conductive-film layer through electroforming. Moreover, the surface of the metallic prism mother die is cleaned according to necessity as described above and then, an electroformed layer is directly formed on the metal.

Electroforming is generally performed under a current condition of approx. 10 A/dm$^2$ in an aqueous solution containing 60 wt % of nickel sulfamate at 40° C. By setting an electroformed-layer-forming rate to mm/48 hr or less, a uniform electroformed layer is easily obtained. However, at a forming rate higher than 48 hr/mm, a trouble easily occurs that surface smoothness is deteriorated or a defective portion is formed in the electroformed layer.

Moreover, in the case of electroforming, it is also possible to perform nickel-cobalt-alloy electroforming added with a component such as cobalt in order to improve the surface abrasion of a die. By adding 10 to 15 wt % of cobalt, it is possible to raise the Vickers hardness Hv up to 300 to 400. Therefore, when molding a synthetic resin by an obtained electroforming die and thereby, manufacturing a triangular-pyramidal cube-corner retroreflective sheeting of the present invention, it is possible to improve the durability of the die.

Thus, it is possible to repeatedly use a first-generation electroforming die formed by the prism mother die as an electroforming master used to form a second-generation electroforming die. Therefore, it is possible to form a plurality of electroforming dies by one prism mother die.

The formed electroforming dies are precisely cut and thereafter, it is possible to use the dies by combining and joining them up to the final size for molding a microprism sheeting by a synthetic resin To join the dies, it is possible to use a method of merely bringing a cut end ice to face with another or a method of welding combined joints through electron-beam welding, YAG laser welding, or carbon-dioxide laser welding.

A combined electroforming die is used to mold a synthetic resin as a synthetic-resin-molding die. The synthetic-resin molding method can use compression molding or injection molding.

Compression molding can be performed by inserting a formed thin-wall nickel electroforming die, a synthetic-resin sheeting with a predetermined thickness, and a silicone-rubber sheeting with a thickness of approx. 5 mm serving as a cushion into a compression-molding press heated up to a predetermined temperature, preheating them for 30 sec at a pressure of 10 to 20% of a molding pressure and then, thermally pressing them for approx. 2 min at a temperature of 180 to 250° C. and a pressure of 10 to 30 kg/cm². Thereafter, by cooling them up to room temperature while pressing them and then releasing pressure, it is possible to obtain a prism molding.

Moreover, it is possible to obtain a continuous sheeting-like product by joining a thin-wall electroforming die with a thickness of approx. 0.5 mm formed through the above method in accordance with the above welding method to form an endless belt die, setting the belt die to a pair of rollers comprising a heating roller and a cooling roller to rotate the belt die, supplying melted synthetic resin to the belt die present on the heating roller in the form of a sheeting, pressure-molding the sheeting by one or more silicone rollers, then cooling the sheeting on the cooling roller to a glass-transition-point temperature or lower, and removing the sheeting from the belt die.

Figure 8:
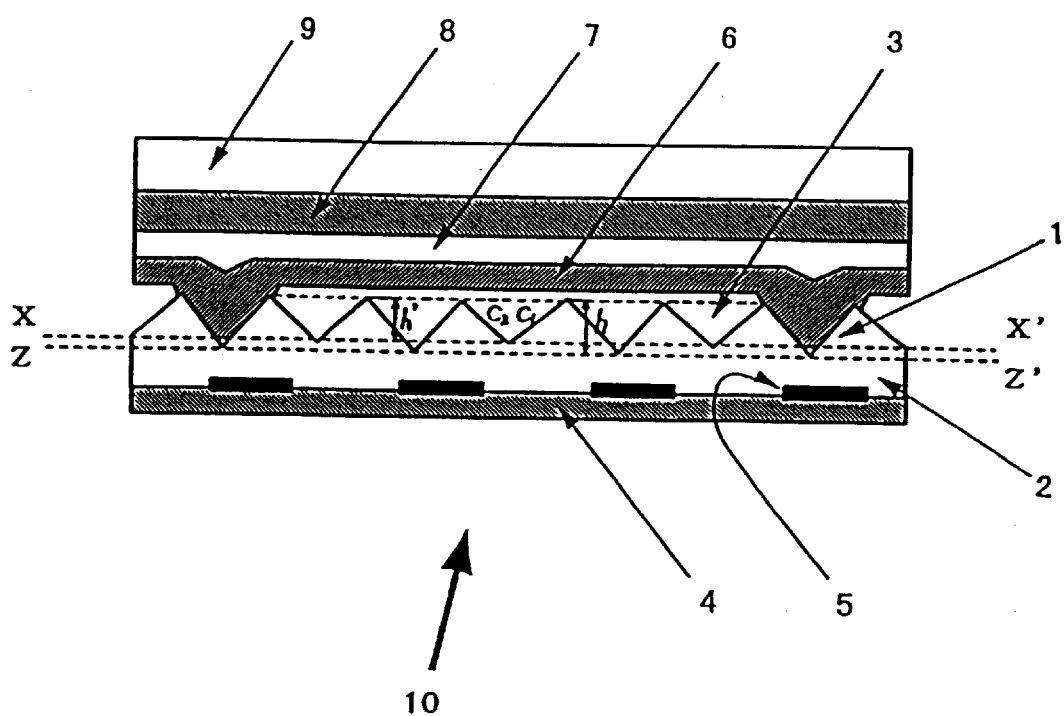
FIG. 8 is a sectional view showing the structure of a mode of a triangular-pyramidal cube-corner reflective sheeting of the present invention.

Then, a mode of a preferable structure of a triangular-pyramidal cube-corner retroreflective sheeting of the present invention is described below by referring to FIG. 8 showing a sectional view of the mode.

In FIG. 8, symbol (1) denotes a reflective-element layer in which triangular-pyramidal reflective elements ($R_1$ and $R_2$) of the present invention are arranged in the closest-packed state, (2) denotes a holder layer for holding reflective elements, and (10) denotes a light entrance direction. Though the reflective element layer (1) and the holder layer (2) are generally integrated, it is also permitted to superimpose a layer on another. Correspondingly to the purpose or operating environment of a retroreflective sheeting of the present invention, it is possible to form a surface protective layer (4), a printing layer (5) for transmitting information to an observer or coloring a sheeting, a binder layer (6) for realizing an airtight structure for preventing moisture from entering the back of the reflective element layer, a support layer (7) for supporting the binder layer (6), and an adhesive layer (8) and a removing-material layer (9) used to attach the retroreflective sheeting to other structure.

It is possible to apply the resin used for the retroreflective-element layer (1) to the surface protective layer (4). However, to improve the weather resistance, it is possible to use one of an ultraviolet absorbent, a light stabilizer, and an antioxidant independently or by combining them. Moreover, it is possible to add various organic and inorganic pigments and dyes to the resin as coloring agents.

It is possible to generally set the printing layer (5) between the surface protective layer (4) and holder layer (2) or on the surface protective layer (4) or the reflective face of the reflective element (1) by means of gravure, screen printing, or ink-jet printing.

Materials for forming the reflective element layer (1) and holder layer (2) are not restricted as long as they meet flexibility that is an object of the present invention. However, it is preferable to use materials having optical transparency and uniformity. The following materials can be used for the present invention: olefin resins such as polycarbonate resin, vinyl-chloride resin, (meth)acrylate resin, epoxy resin, styrene resin, polyester resin, fluorocarbon resin, polyethylene resin, and polypropylene resin, cellulose-based resin, and polyurethane resin.

In general in the case of the reflective-element layer (1) of the present invention, an air layer (3) is set to the back of a cube-corner retroreflective element in order to increase a critical angle meeting the internal total-reflection condition. It is preferable that the reflective-element layer (1) and the support layer (7) are sealed by the binder layer (6) in order to prevent troubles such as decrease of an critical angle and corrosion of a metallic layer due to incoming moisture under an operating condition. The sealing method can use any one of the method disclosed in U.S. Pat. Nos. 3,190,178 and 4,025,159, and Japanese Utility-Model Laid-Open No. 28669/1975. The resin used for the binder layer (6) can use any one of (meth)-acrylic resin, polyester resin, alkyd resin, and epoxy resin. The joining method can properly use any one of the publicly-known thermally-welding-resin joining method, thermosetting-resin joining method, ultraviolet-curing-resin joining method, and electron-beam-curing-resin joining method.

It is possible to apply the binder layer (6) to the entire surface of the support layer (7) or selectively set the layer (6) to a joint with a retroreflective-element layer in accordance with the method such as the printing method.

As a material constituting the support layer (7), it is possible to use any one of a resin constituting a retroreflective-element layer, a general film-moldable resin, fiber, or cloth, and a metallic foil or plate of stainless steel or aluminum independently or by combining them.

It is possible to properly use any publicly-known material for the adhesive layer (8) and the removal layer (9) for an adhesive used to attach a retroreflective sheeting of the present invention to a metallic plate, wooden plane, glass plate, or plastic plate.

BEST MODE FOR CARRYING OUT THE INVENTION

The present invention is more minutely described below by referring to Embodiments and Comparative Examples.

Embodiment 1

A parallel groove having a V-shaped cross section was cut on a 50 mm-square brass plate whose surface was flatly ground in a repetitive pattern in accordance with the fly cutting method in the first direction (z direction in FIG. 3) and the second direction (w direction in FIG. 3) by using a diamond cutting tool having a tip angle of 61.98° so that the repetitive pitch in z and w directions became 203.89 μm, the depth (h) of the groove became 90 μm, and the crossing angle between lines z and w shown by <A-$F_1$-B in FIG. 5 became 68.85°.

Thereafter, the V-shaped parallel groove was cut in the third direction (x direction) by using a diamond cutting tool having a tip angle of 86.53° so that the repetitive pitch (repetitive pitch of line x in FIG. 3) became 180.33 μm, the groove depth (h') became 72 μm, and the crossing angle between the first and second directions on one hand and the third direction on the other became 55.58° to form a mother die in which a plurality of convex triangular-pyramidal cube-corner reflective elements with a height (h) of 90 μm from the second bottom lane(Z-Z'),of the triangular-pyramidal reflective elements up to apexes ($H_1$ and $H_2$) of the triangular-pyramidal reflective elements were arranged in the closest-packed state on a brass plate. The optical-axis tilt angle θ of the triangular-pyramidal reflective elements showed −8°. Moreover, the value of h'/h showed 72/90=0.80.

A convex-cube-corner-molding die which was made of nickel and whose shape was inverted was formed in accordance with the electroforming method by using the above brass mother die.

By using the molding die, a triangular-pyramidal cube-corner retroreflective sheeting made of polycarbonate resin was formed on whose surface cube-corners having a support-layer thickness of 150 μm, h of 90 μm, h' of 72 μm, and prism-face angles of three faces not provided with an angular deviation were arranged in the closest-packed state after compression-molding a polycarbonate resin sheeting with a thickness of 230 μm ("Iupilon Sheet E2000 made by Mitsubishi Engineering-Plastics Corp.) at a molding temperature of 200° C. and a molding pressure of 50 kg/cm² and then cooling the resin sheeting up to 30° C. while the sheeting is pressed and taking it out.

Embodiment 2

A groove having a V-shaped cross section was formed on a 50 mm-square brass plate whose surface was flatly ground in a repetitive pattern in accordance with the fly cutting method by using a diamond cutting tool having a tip angle of 61.90° in the first direction (z direction) and second direction (w direction) and a tip angle of 86.45° in the third direction (x direction) so that the repetitive pitch in the first and second directions became 203.89 μm, the depth (h) of the cut groove became 90 μm, the crossing angle between the first and second directions became 68.85°, the repetitive pitch in the third direction became 180.33 μm, and the depth (h') of the cut groove became 72 μm to form a mother die in which a plurality of convex triangular-pyramidal cube-corners having a height (h) of 90 μm from a virtual plane (Z-Z') of triangular-pyramidal reflective elements were arranged in the closest-packed state on the brass plate. The optical-axis tilt angle θ of the triangular-pyramidal reflective elements showed −8° and prism face angles of three faces constituting a triangular pyramid showed 89.917°. Moreover, the value of h'/h showed 72/89=0.80.

Hereafter, a concave cube-corner-forming die made of nickel was formed similarly to the case of Embodiment 1 and thereby, a polycarbonate-resin sheeting same as that of Embodiment 1 was compression-molded under the same conditions as the case of Embodiment 1 to form a triangular-pyramidal cube-corner retroreflective sheeting made of polycarbonate resin on whose surface cube-corners having a support-layer thickness of approx. 150 μm, h of 90 μm, h' of 72 μm, and prism face angles of three faces constituting a triangle provided with a slight angular deviation were arranged in the closest-packed state.

Comparative Example 1

A groove having a V-shaped cross section was cut on a brass plane whose surface was flatly ground in accordance with the fly cutting method in a repetitive pattern by using a diamond cutting tool having a tip angle of 77.89° in the first direction (z direction) and the second direction (w direction and a tip angle of 54.53° in the third direction (x direction) so that the repetitive pitch in the first and second directions became 184.10 μm, the repetitive pitch in the third direction became 221.02 μm, and the crossing angle between the first and second directions became 49.22° to form a mother die in which a plurality of convex triangular-pyramidal cube-corners having a cube-corner-retroreflective-element height (h) of 90 μm were arranged on the brass plate in the closest-packed state. The optical-axis tilt angle θ of the reflective elements showed +8° and prism face angles of three faces constituting a triangle respectively showed 90°.

A triangular-pyramidal cube-corner retroreflective sheeting made of polycarbonate resin was formed in accordance with the same method as the case of Embodiment 1.

Comparative Example 2

A groove having a V-shaped cross section was cut on a 50 mm-square brass plate whose surface was flatly ground in a repetitive pattern in accordance with the fly cutting method by using a diamond cutting tool having a tip angle of 67.45° in the first direction (z direction) and the second direction (w direction) and a tip angle of 86.45° in the third direction (x direction) so that the repetitive pitch in the first and second directions became 203.89 μm, the repetitive pitch in the third direction became 180.33 μm, and the crossing angle between the first and second directions became 68.85° to form a mother die in which a plurality of convex triangular-pyramidal cube corners having a reflective-element height (h) of 90 μm were arranged in the closest-packed state. The optical-axis tilt angle of the cube-corner retroreflective elements showed −3° and prism-face angles of three faces constituting a triangle showed 90°.

A triangular-pyramidal cube-corner retroreflective sheeting made of polycarbonate resin was formed in accordance with the same method as the case of Embodiment 1.

Table 1 shows the data obtained by measuring the retroreflectivity (brightness unit is cd/lx*m²) of triangular-pyramidal cube-corner retroreflective sheetings formed in the above Embodiments 1 and 2 and Comparative Examples 1 and 2. The retroreflective sheetings of Embodiments 1 and 2 respectively show a high reflectivity in a wide range. In the case of the reflective sheeting of Comparative Example 1, however, the entrance angle ranges between 5° and 10° and the brightness change is large. In the case of the reflective sheeting of Comparative Example 2, the brightness is greatly deteriorated at an entrance angle of 30° and therefore, the entrance angularity is inferior in any Comparative Example.

TABLE 1

| Entrance angle (Degree) | Observation angle (Degree) | Embodiment 1 | Embodiment 2 | Comparative Example 1 | Comparative Example 2 |
|---|---|---|---|---|---|
| 5 | 0.2 | 806 | 852 | 663 | 930 |
|   | 0.33 | 410 | 566 | 334 | 397 |
| 10 | 0.2 | 578 | 683 | 488 | 491 |
|   | 0.33 | 312 | 410 | 202 | 189 |
| 30 | 0.2 | 423 | 445 | 193 | 203 |
|   | 0.33 | 247 | 272 | 78 | 64 |

What is claimed is:
1. A triangular-pyramidal cube-corner retroreflective sheeting characterized in that triangular-pyramidal cube-corner retroreflective elements protruded beyond a first common bottom plane (virtual plane X-X') are arranged so as to be faced each other in the closest-packed state on the first bottom plane (virtual plane X-X') by sharing each base edge on the first bottom plane (virtual plane X-X'), the first bottom plane (virtual plane X-X') is a common plane including the base edges (x, x, . . . ) shared by the triangular-pyramidal reflective elements, two opposite triangular-pyramidal reflective elements form a substantially-same-shape element pair faced each other so as to be substantially symmetric to planes (Y-Y', Y-Y', . . . ) vertical to the first bottom plane including the shared base edges (x, x, . . . ) on the first bottom plane (virtual plane X-X'), the triangular-pyramidal reflective elements are formed by substantially same triangular lateral faces (faces $c_1$ and $c_2$) using each of the shared base edges (x, x, . . . ) as one side and two substantially same quadrangular lateral faces (faces $a_1$ and $b_1$ or faces $a_2$ or $b_2$) substantially perpendicularly crossing the lateral faces (faces $c_1$ and $c_2$), which (the above lateral faces $a_1$ and $b_1$ or lateral faces $a_2$ or $b_2$) use each of two upper sides of the triangular lateral faces (faces $c_1$ and $c_2$) started from apexes ($H_1$ and $H_2$) of the triangular-pyramidal reflective elements as one side and share one ridge line of the triangular-pyramidal reflective elements as one side, and the height (h') from the apexes ($H_1$ and $H_2$) of the triangular-pyramidal reflective elements up to the first bottom plane (virtual plane X-X') including the base edges (x, x, . . . ) of the triangular lateral faces (faces $c_1$ and $c_2$) of the triangular-pyramidal reflective elements is substantially smaller than the height (h) from the apexes ($H_1$ and $H_2$) of the triangular-pyramidal reflective elements up to a substantially-horizontal second bottom plane (Z-Z') including base edges (z and w) of other lateral faces (faces $a_1$ and $b_1$ or faces $a_2$ or $b_2$) of the triangular-pyramidal reflective elements.

2. A triangular-pyramidal cube-corner retroreflective sheeting characterized in that triangular-pyramidal cube-corner retroreflective elements protruded beyond a first common bottom plane (virtual plane X-X') are arranged so as to be faced each other in the closest-packed state on the first bottom plane (virtual plane X-X') by sharing each base edge on the first bottom plane (virtual plane X-X'), the first bottom plane (virtual plane X-X') is a common plane including the base edges (x, x, . . . ) shared by the triangular-pyramidal reflective elements, two opposite triangular-pyramidal reflective elements form a substantially-same-shape element pair faced each other so as to be substantially symmetric to planes (Y-Y', Y-Y', . . . ) vertical to the first bottom plane including the shared base edges (x, x, . . . ) on the first bottom plane (virtual plane X-X'), lateral faces (faces $c_1$ and $c_2$) using each of the shared base edges (x, x, . . . ) of the triangular-pyramidal reflective elements as one side are respectively formed into a substantially same triangle and arranged along the shared base edges (x, x, . . . ), two other lateral faces (faces $a_1$ and $b_1$ or faces $a_2$ or $b_2$) forming the triangular-pyramidal reflective elements form substantially same quadrangular lateral faces by using each of two upper sides of the triangular lateral faces (faces $c_1$ and $c_2$) started from apexes ($H_1$ and $H_2$) of the triangular-pyramidal reflective elements as one side and sharing one ridge line of the triangular-pyramidal reflective elements as one side, a second bottom plane (Z-Z') including base edges (z and w) of the quadrangular lateral faces (faces $a_1$ and $b_1$) formed because the quadrangular lateral faces ($a_1$ and $b_1$) cross the corresponding quadrangular lateral faces (face $a_2$ or $b_2$) of other triangular-pyramidal reflective elements adjacent to the lateral faces (faces $a_1$ and $b_1$) is substantially parallel with the first bottom plane (virtual plane X-X') and located substantially below the first bottom plane (X-X') including the base edges (x, x, . . . ) of the triangular-pyramidal reflective elements, and an optical axis via apexes of the triangular-pyramidal reflective elements tilts by at least 3° from a vertical line ($H_1$-P) extended from apexes of the triangular-pyramidal reflective elements up to the second bottom plane in a direction in which the difference (q–p) between the distance (q) from the intersection (Q) between the optical axis and the second bottom plane (Z-Z') up to the plane (Y-Y') including the base edges (x, x, . . . ) shared by the element pair and vertical to the first bottom plane (X-X') and the distance (p) from the intersection (P) between a vertical line extended from the apexes ($H_1$ and $H_2$) of the elements to the second bottom plane (Z-Z') and the second bottom plane (Z-Z') up to the vertical plane (Y-Y') including the base edges (x, x, . . . ) shared by the element pair becomes negative (–).

3. The triangular-pyramidal cube-corner retroreflective sheeting according to claim 1 or 2, characterized in that when assuming that the height from a first bottom plane (virtual plane X-X') of apexes ($H_1$ and $H_2$) of triangular-pyramidal reflective elements as h' and the height from the second bottom plane (Z-Z') of the apexes ($H_1$ and $H_2$) as h, the value of h'/h ranges between 0.67 and 0.95.

4. The triangular-pyramidal cube-corner retroreflective sheeting according to claim 1 or 2, characterized in that when assuming that the height from a first bottom plane (virtual plane X-X') of apexes ($H_1$ and $H_2$) of triangular-pyramidal reflective elements as h' and the height from the second bottom plane (Z-Z') of the apexes ($H_1$ and $H_2$) as h, the value of h'/h ranges between 0.71 and 0.93.

5. The triangular-pyramidal cube-corner retroreflective sheeting according to claim 1 or 2, characterized in that an optical axis of triangular-pyramidal reflective elements tilts by 4° to 15° from a vertical line ($H_1$-P) extended from apexes of the triangular-pyramidal reflective elements to a second bottom plane in a direction in which the difference (q–p) between the distance (p) from the intersection (P) between a vertical line extended from apexes ($H_1$ and $H_2$) of the triangular-pyramidal reflective elements to a second bottom plane (Z-Z') and the second bottom plane (Z-Z') up to the vertical plane (Y-Y') including the base edges (x, x, . . . ) shaped by elements and the distance (q) from the intersection (Q) between the optical axis of the triangular-pyramidal reflective elements and the bottom plane (Z-Z') up to the vertical plane (Y-Y') becomes negative (–).

6. The triangular-pyramidal cube-corner retroreflective sheeting according to claim 1 or 2, characterized in that an optical axis of triangular-pyramidal reflective elements tilts by 5° to 12° from a vertical line ($H_1$-P) extended from apexes of the triangular-pyramidal reflective elements to a second bottom plane in a direction in which the difference (q–p) between the distance (p) from the intersection (P) between a vertical line extended from apexes ($H_1$ and $H_2$) of the triangular-pyramidal reflective elements to a second bottom plane (Z-Z') and the second bottom plane (Z-Z') up to the vertical plane (Y-Y') including the base edges (x, x, . . . ) shaped by elements and the distance (q) from the intersection (Q) between the optical axis of the triangular-pyramidal reflective elements and the bottom plane (Z-Z') up to the vertical plane (Y-Y') becomes negative (–).

7. The triangular-pyramidal cube-corner retroreflective sheeting according to claim 1 or 2, characterized in that the distance (h) from a second bottom plane (Z-Z') including a plurality of base edges (z and w) of quadrangular lateral faces (faces $a_1$ and $b_1$ or faces $a_2$ or $b_2$) formed because the substantially same quadrangular lateral faces (faces $a_1$ and $b_1$) share one ridge line stated from apexes ($H_1$ and $H_2$) of a plurality of triangular-pyramidal cube-corner retroreflective elements protruded beyond a first bottom plane (X-X') as one side cross the corresponding quadrangular lateral faces (face $a_2$ or $b_2$) of other triangular-pyramidal reflective elements adjacent to the lateral faces (faces $a_1$ and $b_2$) up to the apexes ($H_1$ and $H_2$) of the triangular-pyramidal reflective elements ranges between 50 and 400 μm.

8. The triangular-pyramidal cube-corner retroreflective sheeting according to claim 1 or 2, characterized in that the distance (h) from a second bottom plane (Z-Z') including a plurality of base edges (z and w) of quadrangular lateral faces (faces $a_1$ and $b_1$ or faces $a_2$ or $b_2$) formed because the substantially same quadrangular lateral faces (faces $a_1$ and $b_1$) share one ridge line started from apexes ($H_1$ and $H_2$) of a plurality of triangular-pyramidal cube-corner retroreflective elements protruded beyond a common first bottom plane (X-X') as one side cross the corresponding quadrangular lateral faces (face $a_2$ or $b_2$) of other triangular-pyramidal reflective elements adjacent to the lateral faces (faces $a_1$ and $b_1$) up to the apexes ($H_1$ and $H_2$) of the triangular-pyramidal reflective elements ranges between 60 and 200 μm.

9. The triangular-pyramidal cube-corner retroreflective sheeting according to claim 1 or 2, characterized in that at least one prism face angle formed because three lateral faces (faces $a_1$, $b_1$, and $c_1$ or faces $a_2$, $b_2$, and $c_2$) of triangular-pyramidal cube corner retroreflective elements cross each other ranges between 89.5° and 90.5°.

10. The pyramidal cube-corner retroreflective sheeting according to claim 1 or 2, characterized in that at least one prism face angle formed because three lateral faces (faces $a_1$, $b_1$, and $c_1$ or faces $a_2$, $b_2$, and $c_2$) of triangular-pyramidal cube-corner retroreflective elements cross each other ranges between 89.7° and 90.3°.

* * * * *

UNITED STATES PATENT AND TRADEMARK OFFICE
CERTIFICATE OF CORRECTION

PATENT NO. : 6,685,323 B1
DATED : February 3, 2004
INVENTOR(S) : Ikuo Mimura et al.

It is certified that error appears in the above-identified patent and that said Letters Patent is hereby corrected as shown below:

Column 2,
Line 58, "doe" should read -- does --.

Column 4,
Line 58, "(B13)," should read -- (B1), --.

Column 5,
Line 31, ",reflective" should read -- reflective --.

Column 8,
Line 24, "face cl" should read -- face c, --;
Line 40, "anges" should read -- angles --; and Lines 50-53, " 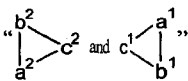 " should read 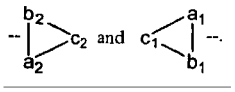

Column 9,
Lines 10-15, 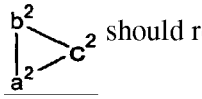 should read 

Column 12,
Line 67, "-5" should read -- 5° --.

Column 13,
Line 65, "64.4" should read -- 64.4° --.

Column 14,
Line 19, "64.7" should read -- 64.7° --.

Column 16,
Line 22, "frequency" should read -- frequently --.

Column 17,
Line 4, "resin" should read -- resin. --; and
Line 5, "ice" should read -- face --.

Column 19,
Line 9, "angle 0" should read -- angle θ --.

Column 22,
Line 67, "stated" should read -- started --.

UNITED STATES PATENT AND TRADEMARK OFFICE
CERTIFICATE OF CORRECTION

PATENT NO.   : 6,685,323 B1
DATED        : February 3, 2004
INVENTOR(S)  : Ikuo Mimura et al.

It is certified that error appears in the above-identified patent and that said Letters Patent is hereby corrected as shown below:

Column 24,
Lines 8 and 14, "cube corner" should read -- cube-corner --.

Signed and Sealed this

Twenty-fourth Day of August, 2004

JON W. DUDAS
*Director of the United States Patent and Trademark Office*